(12) United States Patent
Monson et al.

(10) Patent No.: US 7,559,485 B2
(45) Date of Patent: Jul. 14, 2009

(54) VARIABLE ORIFICE VALVE

(75) Inventors: Robert J. Monson, St. Paul, MN (US); John P. Abraham, Minneapolis, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 724 days.

(21) Appl. No.: 11/187,332

(22) Filed: Jul. 22, 2005

(65) Prior Publication Data
US 2007/0018008 A1    Jan. 25, 2007

(51) Int. Cl.
*G05D 23/02*    (2006.01)
(52) U.S. Cl. .................. 236/93 R; 236/101 R; 236/103; 251/337
(58) Field of Classification Search ............... 236/93 R, 236/101 R, 103, 86, 87, 101 B, 101 D; 251/333, 251/337
See application file for complete search history.

(56) References Cited

U.S. PATENT DOCUMENTS

| | | | | | |
|---|---|---|---|---|---|
| 3,237,862 | A | * | 3/1966 | Zadoo et al. | 236/93 R |
| 4,570,851 | A | * | 2/1986 | Cirillo | 236/93 R |
| 4,570,852 | A | * | 2/1986 | Ohkata | 236/93 R |
| 4,778,104 | A | * | 10/1988 | Fisher | 236/80 R |
| 5,261,597 | A | * | 11/1993 | Perlman et al. | 236/93 R |
| 6,381,988 | B1 | | 5/2002 | Bennett | |
| 6,497,372 | B2 | * | 12/2002 | Lee et al. | 236/93 R |
| 2007/0017239 | A1 | | 1/2007 | Monson et al. | |
| 2007/0018006 | A1 | | 1/2007 | Monson et al. | |

* cited by examiner

*Primary Examiner*—Marc E Norman
(74) *Attorney, Agent, or Firm*—Hamre, Schumann, Mueller & Larson, P.C.

(57) ABSTRACT

A variable orifice valve provides a changing orifice dimension based solely upon the temperature or other property of the fluidic medium, such as flow-rate of the fluidic medium passing through the valve, and is actuated via a thermally active wire or flow-rate activated spring, for example, immersed in the fluidic medium.

10 Claims, 4 Drawing Sheets

VARIABLE ORIFICE VALVE

BACKGROUND OF THE INVENTION

1. Field of the Invention

This invention relates generally to valves, and more particularly to a variable orifice valve that regulates a flow rate through the valve based upon a property of the fluidic medium, such as, for example, but not limited to its temperature or flow rate, passing through the valve.

2. Description of the Prior Art

Modern electronic systems and devices often require cooling to maintain their operational efficiency. Further, many of these systems and devices are extremely large requiring that only sections or portions of these systems or devices remain operational at any given moment in time. Such systems and devices therefore will require cooling of only the sections or portions that are operational.

Present cooling techniques employ a tank or supply area to receive the return fluid from a cooling system by means of free flow. Such techniques therefore are not efficient since they do not allow direct control of differential flow of cooling fluid into areas of greater need, except by direct valving or orifice control.

Consider for example, an array 100 having four sections such as shown in FIGS. 1A, 1B and 1C. In FIG. 1A, array 100 can be seen to exhibit section temperatures of 50° F. and 200° F. in the upper two sections from left to right respectively; while the lower two sections exhibit section temperatures of 60° F. and 50° F. from left to right respectively. Consider now also a convective cooling system: If a conventional uniform cooling approach is utilized to cool the array 100, only 25% of the coolant may come into contact with the hot 200° F. area, quickly reaching the maximum heat flux of the cooling system. Thus, as seen in FIG. 1B, the hot 200° F. area may cool down to only 150° F. Although better, the efficiency of uniform cooling falls short of the desired results. Consider now instead, a cooling system that directs 75% of the coolant fluid through the hot 200° F. zone, with the remaining 25% used for the other zones. Such a cooling system can be expected to extract heat more effectively. Smart cooling therefore, results in a more efficient transfer of thermal energy to yield the array temperatures depicted in FIG. 1C.

In view of the foregoing background, it would be extremely beneficial and advantageous to provide a system component such as a valve that operates in response to a fluidic medium temperature, thus allowing direct control of differential flow of cooling fluid into areas of greater need to enable gracefully enhanced cooling or heating of highly thermally disparate parts.

SUMMARY OF THE INVENTION

The present invention is directed to a variable orifice valve that will provide a changing orifice dimension based upon, for example, the temperature or flow rate of the fluidic medium passing through the valve, and that is actuated, for example, via a thermally active wire immersed in the fluidic medium. Since the variable orifice valve provides a changing orifice dimension based upon the fluidic medium temperature, the flow rate of the fluidic medium is thermally regulated in a manner that allows greatly enhanced cooling or heating of highly thermally disparate systems or devices. Further, the variable orifice valve changes the orifice dimension via insertion of a tapered plunger element in contradistinction with known valves that employ a shutter type mechanism to modify a flow rate through the valve. This will result in less fluidic disruption than that produced by a shutter type valve, as a toroidal orifice allows flow similar to an open orifice in nature. Thus, less turbulent flow is introduced.

One embodiment of the variable orifice valve employs a valve body having a fixed cross-sectional flow area; a variable cross-sectional flow area; and a movable element that operates to modify the resultant cross-sectional flow area of the variable cross-sectional flow area, to control the rate of fluidic flow through the valve. The movable element is most preferably a tapered plunger attached to a thermal wire spring. The thermal wire spring is attached such that it operates in response to the fluidic temperature to move the tapered plunger toward or away from the variable cross-sectional flow area as the fluidic temperature rises and falls, thus modifying the fluidic flow through the valve. Other types of activation means can just as easily be employed, such as, for example, but not limited to, a flow-rate activated spring mechanism.

BRIEF DESCRIPTION OF THE DRAWINGS

Other aspects, features and advantages of the present invention will be readily appreciated as the invention becomes better understood by reference to the following detailed description when considered in connection with the accompanying drawing figures wherein.

While the above-identified drawing figures set forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

Figure 1A:
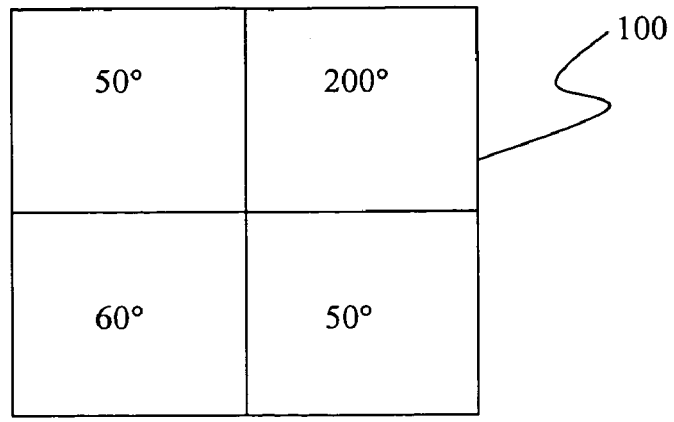
FIG. 1A depicts a system or device array having four distinct heat/cool zones.
Figure 1B:
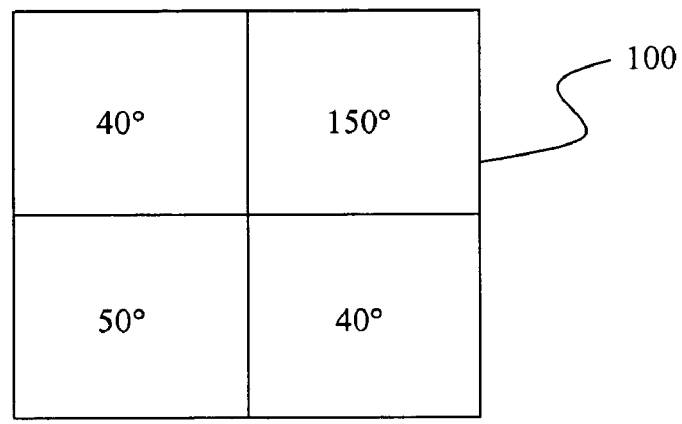
FIG. 1B shows the temperature effects of uniform cooling applied to the distinct heat/cool zones depicted in FIG. 1A.
Figure 1C:
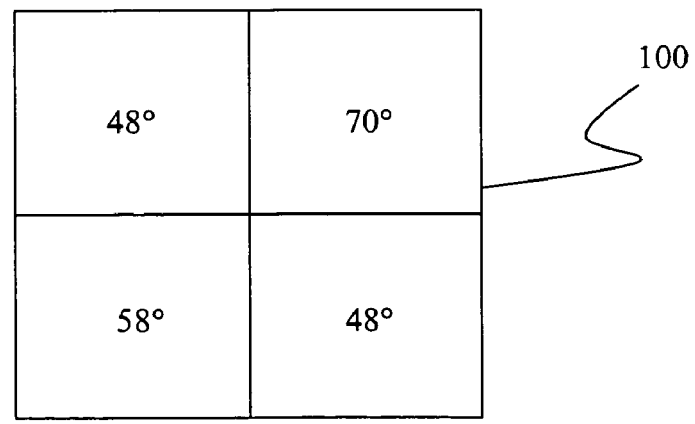
FIG. 1C shows the temperature effects of smart cooling applied to the distinct heat/cool zones depicted in FIG. 1A.
Figure 2:
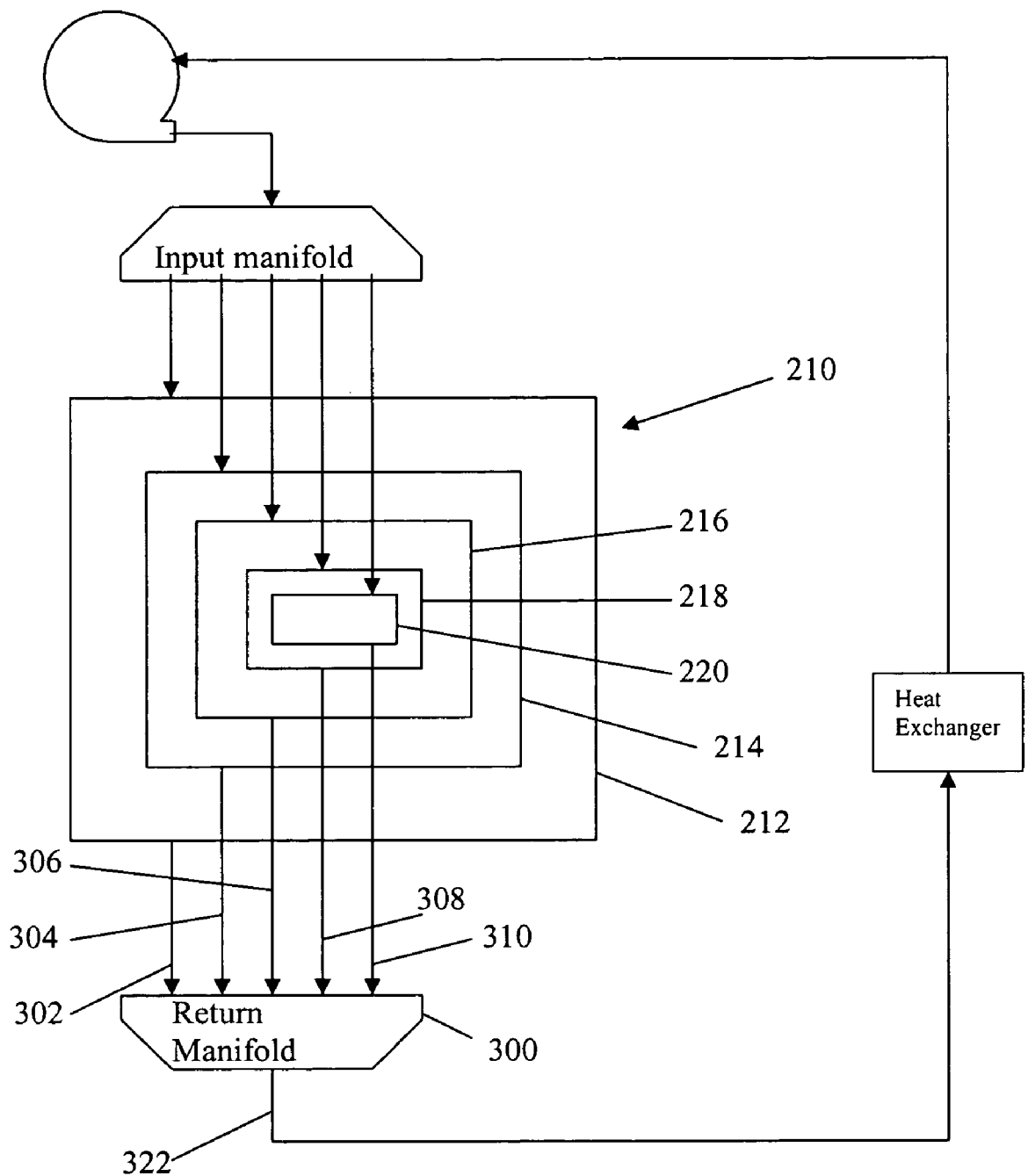
FIG. 2 is a simplified system diagram illustrating a self-regulating cooling system.

Looking now at FIG. 2, a simplified block diagram illustrates a self-regulating cooling/heating system 200. Self-regulating cooling/heating system 200 operates to cool or heat selected portions 212, 214, 216, 218, 220 of a radar array 210. Each portion 212-220 of the radar array 210 is cooled or heated independently of any other portion as now described below. Self-regulating cooling/heating system 200 can be seen to include a return manifold 300 having a plurality of input ports 302, 304, 306, 308, 310. Each input port 302, 304, 306, 308, 310 is connected to a single unique portion or section 212, 214, 216, 218, 220 of the radar array 210. Manifold 300 can be seen to also have a single output port 322. Cooling/heating system 200 has a heat transfer device such as a heat exchanger, that operates to cool or heat the coolant or heating medium that is employed to cool or heat the sections of the radar array 210. Any suitable coolant or heating medium such as a liquid medium, gaseous medium, or coolant/heating medium, such as, but not limited to Freon, that changes state in response to temperature changes, can be employed, so long as the desired heat transfer characteristics are achieved. The heat exchanger has a single input port that receives coolant/heating medium from the single output port 322 of the manifold 300. Subsequent to cooling or heating, the coolant or heating medium is exhausted via a single heat exchanger output port wherein the coolant or heating medium is redirected back to any coolant/heating medium input port(s) associated with the radar array 210.

Figure 3:
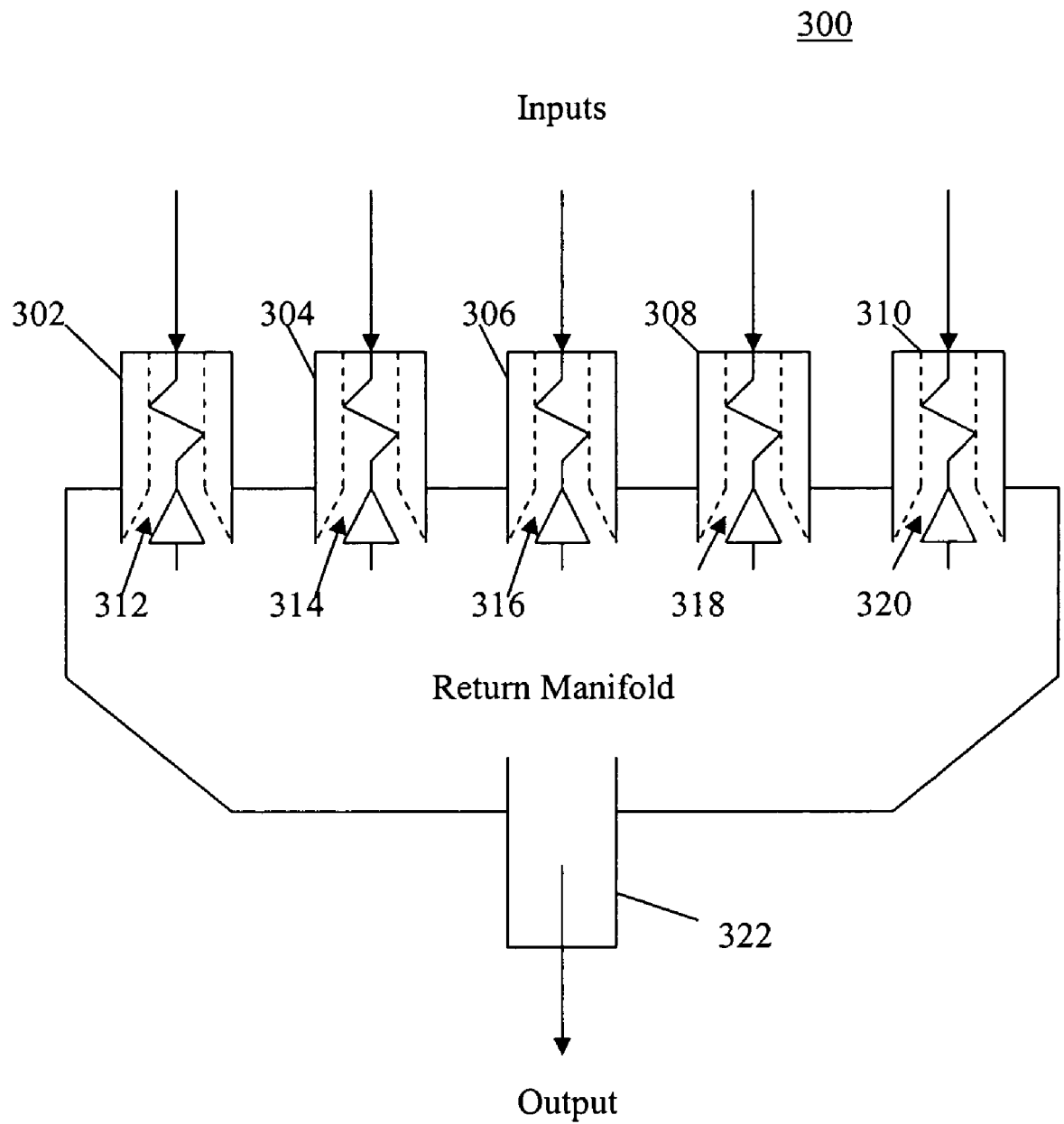
FIG. 3 is a more detailed view of the return manifold depicted in FIG. 2.

Looking now at FIG. 3, each of the return manifold 300 input ports 302, 304, 306, 308, 310 can be seen to most preferably employ a passive self-regulating thermal gate 312, 314, 316, 318, 320. Each passive self-regulating thermal gate 312-320 most preferably comprises a variable orifice valve in which the orifice increasingly opens or closes in response to changes in the temperature of the fluidic medium passing through the thermal gate. In this manner, each variable orifice valve will continue to successfully operate, even in the absence of any type of active control, such as that which may be provided via a computerized control unit or system. Each self-regulating thermal gate may however, be passively controlled or controlled via an active controller. Passive control is most preferred, since the passive, self-regulating thermal gate will continue to function in its normal temperature sensing mode to control the size of the variable orifice regardless of whether the control system or device remains operational.

Figure 4:
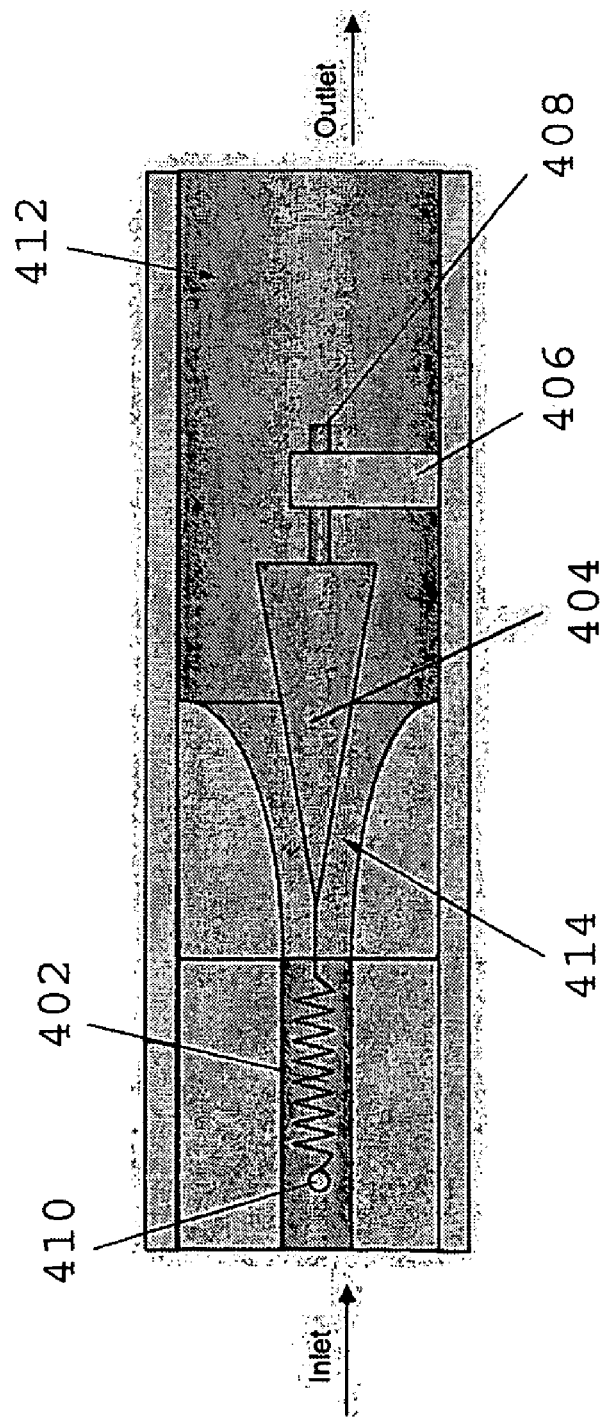
FIG. 4 illustrates a variable orifice valve according to one embodiment of the present invention.

FIG. 4 illustrates a variable orifice valve 400 according to one embodiment of the present invention. Variable orifice valve 400 is suitable for use as one or more of the thermal gates 312-320 described herein before with reference to FIGS. 2 and 3. Variable orifice valve 400 can be seen to include a thermal sensing wire spring 402 that is attached to the valve body via a fixed pin 410 or other suitable means at one end. The other end of the thermal sensing wire spring 402 is attached to one end of a tapered plunger element 404. The other end of the tapered plunger element 404 includes a guide element 408. Movement of guide element 408 is controlled via a guide mount 406. Variable orifice valve 400 can further be seen to have a fixed cross-sectional flow area 412 and a variable cross-sectional flow area 414.

As a fluidic medium passes through the variable orifice valve 400, it comes into contact with the thermal wire spring 402. Thermal wire spring 402 will contract or expand, thus altering its length in response to the temperature of the fluidic medium. The fluidic medium may comprise a liquid, gas, or medium that changes state or undergoes a phase transition in response to changes in temperature. As the length of the thermal wire spring 402 changes, the tapered plunger element 404 will move further into or out of variable cross-sectional flow area 414, thus modifying the resultant cross-sectional flow area of the variable cross-section flow area 414. As the tapered plunger element 404 moves further into the variable cross-sectional flow area 414, the resultant cross-sectional flow area will be reduced to further restrict the flow of fluidic medium through the variable orifice valve 400. As the tapered plunger element 404 moves further away or out of the variable cross-sectional flow area 414, the resultant cross-sectional flow area will be increased to allow greater flow of fluidic medium through the variable orifice valve 400. The path of movement of the tapered plunger element 404 is strategically controlled via a sliding motion of guide element 408 as it passes through the guide mount 406.

In summary explanation, the return fluid from a cooling system is typically returned to a tank or supply area by means of free flow. This does not allow direct control of differential flow of cooling fluid into areas of greater need in enclosures and the like except by direct valving or orifice control. Self-regulating action is thus not allowed to take place. If the free flow of the fluid was controlled by means of a thermally operated variable orifice valve, the variable orifice valve would increase the back pressure on the cooling system for those fluid paths not requiring as much cooling. This would force additional cooling fluid across the fluid paths of free flow, resulting in a greater cooling of those paths requiring more heat removal. This would be controlled by the temperature of the fluid passing through the thermally operated variable orifice valve. The foregoing variable orifice valve provides a self-regulating capacity not presently available in the industry without expensive flow control feedback systems. A system using such a valve will, in contradistinction with presently available systems, most preferably operate passively and accomplish the same result. Although an embodiment has been described with reference to a thermally acting spring, the present invention is not so limited; and it shall be understood that a flow-rate activated spring or other type of spring activation means could also be employed to implement other embodiments according to the principles of the invention described herein before.

In view of the above, it can be seen the present invention presents a significant advancement in the art of valve design. Further, this invention has been described in considerable detail in order to provide those skilled in the heat transfer arts with the information needed to apply the novel principles and to construct and use such specialized components as are required.

It should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow. The tapered plunger element, for example, may employ any number of different three-dimensional geometric configurations, so long as it operates to modify the resultant cross-sectional area in accordance with the principles described herein before.

What is claimed is:

1. A variable orifice valve, comprising:

a valve housing that includes an inlet end, an outlet end, and a fluid flow path extending from the inlet end to the outlet end, the fluid flow path including a fixed cross-sectional flow area and a variable cross-sectional flow area;

the variable cross-sectional flow area having a first end, a second end, and a wall extending from the first end to the second end, the wall being continuously curved from the first end to the second end so that the cross-sectional flow area increases from the first end to the second end;

a moveable, tapered plunger element mounted in the fluid flow path of the valve housing, the tapered plunger element having a first end disposed within the variable cross-sectional flow area, a second end, and an outer surface from the first end to the second end having a linear slope where the tapered plunger element increases in diameter from the first end to the second end in the direction of fluid flow through the fluid flow path; and a thermal spring engaged with the tapered plunger element, the thermal spring being disposed within the fluid flow path whereby the thermal spring is exposed to fluid flowing through the fluid flow path.

2. The variable orifice valve of claim 1, wherein the valve housing is tubular with the inlet end coaxial with the outlet end, the diameter of the inlet end of the housing being equal to the diameter of the outlet end, the second end of the variable cross-sectional flow area abuts the fixed cross-sectional flow area, and the variable cross-sectional flow area is between the inlet end and the fixed cross-sectional flow area.

3. The variable orifice valve of claim 1, wherein the straight-line length of the variable cross-sectional flow area from the first end to the second end is less than the straight-line length of the tapered plunger element from the first end to the second end thereof.

4. The variable orifice valve of claim 1, wherein the thermal spring is connected to the first end of the tapered plunger element and extends toward the inlet end.

5. The variable orifice valve of claim 4, further comprising a guide element connected to the second end of the tapered plunger element, and a guide mount connected to the valve housing within the fixed cross-sectional flow area that is engaged with the guide element.

6. A valve, comprising:
   a valve housing that includes a fluid flow path with a fixed cross-sectional flow area and a variable cross-sectional flow area;
   the variable cross-sectional flow area having a continuously curved wall whereby the cross-sectional flow area increases in a direction of fluid flow through the fluid flow path;
   a moveable, tapered plunger element mounted in the fluid flow path of the valve housing, the tapered plunger element having a first end disposed within the variable cross-sectional flow area, and an outer surface having a linear slope where the tapered plunger element increases in diameter from the first end to the second end in the direction of fluid flow through the fluid flow path, the outer surface of the tapered plunger element cooperating with the continuously curved wall to define a flow passage therebetween which varies as the tapered plunger element moves; and
   a thermal spring engaged with the tapered plunger element, the thermal spring being disposed within the fluid foxy path whereby the thermal spring is exposed to fluid flowing through the fluid flow path.

7. The valve of claim 6, wherein the valve housing is tubular with an inlet end coaxial xvith an outlet end, the diameter of the inlet end of the housing being equal to the diameter of the outlet end, the variable cross-sectional flow area abuts the fixed cross-sectional flow area, and the variable cross-sectional flow area is between the inlet end and the fixed cross-sectional flow area.

8. The valve of claim 6, wherein the variable cross-sectional flow area has a straight-line length that is less than a straight-line length of the tapered plunger element from the first end to the second end thereof.

9. The valve of claim 6, wherein the thermal spring is connected to the first end of the tapered plunger element and extends away from the fixed cross-sectional flow area.

10. The valve of claim 9, further comprising a guide element connected to the second end of the tapered plunger element, and a guide mount connected to the valve housing within the fixed cross-sectional flow area that is engaged with the guide element.

* * * * *